US009083183B2

(12) United States Patent
Mehta

(10) Patent No.: US 9,083,183 B2
(45) Date of Patent: Jul. 14, 2015

(54) SYSTEMS AND METHODS FOR PRESENTING CONTINGENCY ANALYSIS RESULTS

(75) Inventor: Shobhit Mehta, Rockledge, FL (US)

(73) Assignee: General Electric Company, Schenectady, NY (US)

(*) Notice: Subject to any disclaimer, the term of this patent is extended or adjusted under 35 U.S.C. 154(b) by 521 days.

(21) Appl. No.: 13/221,229

(22) Filed: Aug. 30, 2011

(65) Prior Publication Data

US 2013/0055133 A1 Feb. 28, 2013

(51) Int. Cl.
*G06F 15/16* (2006.01)
*H02J 3/00* (2006.01)
*H02J 13/00* (2006.01)

(52) U.S. Cl.
CPC .............. *H02J 3/00* (2013.01); *H02J 13/0062* (2013.01); *H02J 2003/001* (2013.01); *H02J 2003/007* (2013.01); *Y02E 60/74* (2013.01); *Y02E 60/76* (2013.01); *Y02E 60/7838* (2013.01); *Y04S 10/30* (2013.01); *Y04S 10/525* (2013.01); *Y04S 40/124* (2013.01); *Y04S 40/22* (2013.01)

(58) Field of Classification Search
CPC ................................................ H02J 2003/001
USPC .......................................... 715/769; 709/224
See application file for complete search history.

(56) References Cited

U.S. PATENT DOCUMENTS

| 5,646,343 | A | 7/1997 | Pritchard | |
|---|---|---|---|---|
| 6,164,128 | A | 12/2000 | Santa Cruz et al. | |
| 7,523,001 | B2 | 4/2009 | Morjaria et al. | |
| 2004/0158772 | A1* | 8/2004 | Pan et al. | 714/14 |
| 2009/0030557 | A1* | 1/2009 | Castelli et al. | 700/292 |
| 2009/0031241 | A1* | 1/2009 | Castelli et al. | 715/772 |
| 2010/0241608 | A1* | 9/2010 | Huang et al. | 706/52 |
| 2011/0175750 | A1* | 7/2011 | Anderson et al. | 340/870.16 |
| 2011/0288895 | A1* | 11/2011 | Perez et al. | 705/7.12 |
| 2012/0179301 | A1* | 7/2012 | Aivaliotis et al. | 700/286 |
| 2013/0232094 | A1* | 9/2013 | Anderson et al. | 706/12 |

OTHER PUBLICATIONS

Sun, et al., Visualizations for Power System Contingency Analysis Data, IEEE Transactions on Power Systems, dated Nov. 2004, 8 pages.
Overbye, et al., Visualizations of Power System Data, Proc. 33rd Hawaii International Conference on System Sciences., dated Jan. 2000, 7 pages.

* cited by examiner

*Primary Examiner* — William Bashore
*Assistant Examiner* — Nathan Shrewsbury
(74) *Attorney, Agent, or Firm* — Armstrong Teasdale LLP

(57) ABSTRACT

A method for use in monitoring a utility network includes identifying, via a computing device, at least one contingent performance violation associated with a first element of a plurality of transmission elements of a utility network. The method includes presenting by the computing device a risk indicator corresponding to the contingent performance violation around a graphical representation of the first element.

17 Claims, 5 Drawing Sheets

SYSTEMS AND METHODS FOR PRESENTING CONTINGENCY ANALYSIS RESULTS

BACKGROUND OF THE INVENTION

The field of the disclosure herein relates generally to contingency analysis and, more specifically, to systems and methods for use in presenting contingency analysis results for a utility network.

Contingency analysis (CA) is often used to analyze a system that may be exposed to one or more possible occurrences (sometimes referred to as contingencies) to determine how such occurrences may impact the system and/or one or more components of the system. Although CA results may indicate undesirable impacts to the system or component(s) of the system under one or more contingencies, such results may be used to control or modify the system in an attempt to avoid or minimize such undesirable outcomes. For example, in the context of utility networks, CA is commonly used to analyze contingencies affecting transmission elements (e.g., transmission lines, buses, breakers, transformers, etc.) and to determine how the network may be impacted by one or more contingencies relating to such elements. Unless control and monitoring of a system is fully automated, CA results typically need to be presented (e.g., displayed, printed, etc.) to a human operator or monitor of the system.

At least some known systems present an operator with a matrix based representation of CA results. In such displays, rows of the matrix generally represent contingencies, and columns of the matrix represent elements of the utility network. Some other known systems present CA results on a two dimensional (2D) representation of the network, such as a one-line diagram, in which the size or color of elements impacted by one or more contingency is changed relative to the other elements. Other known systems describe three dimensional (3D) visualizations of CA results data on a 3D representation of the system analyzed.

However, in known systems, presentation of the CA results may be confusing and/or incomplete. For example, some matrix displays may lack visual feedback of transmission elements. Moreover, at least some known matrices do not correlate the CA results to geographical information. The proposed 2D and 3D representations of CA results are often confusing and difficult for an operator to comprehend.

BRIEF DESCRIPTION OF THE INVENTION

In one aspect, a method for use in monitoring a utility network is provided. The method includes identifying, via a computing device, at least one contingent performance violation associated with a first element of a plurality of transmission elements of a utility network. The method includes presenting by the computing device a risk indicator corresponding to the contingent performance violation around a graphical representation of the first element.

In another aspect, a system for use in monitoring a utility network is provided. The system includes a memory device configured to store a plurality of contingency analysis results associated with a utility network. The system includes a processor coupled in communication with said memory device. The processor is programmed to identify at least one contingent performance violation associated with a first element of a plurality of transmission elements of the utility network and to graphically present a risk indicator corresponding to the contingent performance violation around a graphical representation of the first element.

In yet another aspect, one or more computer-readable storage media having computer-executable instructions embodied thereon are provided. When executed by at least one processor, the computer-executable instructions cause the at least one processor to identify at least one contingent performance violation associated with a first element of a plurality of transmission elements of a utility network and present a risk indicator corresponding to the contingent performance violation around a graphical representation of the first element.

DETAILED DESCRIPTION OF THE INVENTION

The embodiments described herein facilitate monitoring of a utility network by presenting contingency analysis (CA) results to a user in an easy to understand format. As used herein, a utility includes, but is not limited to only including, electricity, natural gas, water (e.g., fresh water, sewage, or drainage), television service, and/or wired or wireless telecommunication service. A utility is conveyed from one or more sources, to one or more demand points or sites by a utility network. For example, a source may include a utility generation facility and/or a specific point along a utility transmission line. A site may include, but is not limited to only including, a utility distribution facility (e.g., a substation and/or a transformer), a residential property, a commercial property, and/or an industrial property. The means of conveying a utility may be dependent on the nature of the utility. For example, electricity may be conveyed via electrically conductive cables, whereas natural gas and potable water are generally conveyed via a piping network. Telecommunication service may be conveyed by electrically conductive cables, optical cables, and/or wireless transmission.

Embodiments are described herein with reference to utility networks for electricity. However, embodiments of the present invention may be used to monitor and present CA results with respect to any type of utility service.

An exemplary technical effect of the methods, systems, and apparatus described herein includes at least one of (a) identifying at least one contingent performance violation associated with a first element of a plurality of transmission elements of a utility network; (b) presenting a risk indicator corresponding to a contingent performance violation around a graphical representation of the first element; (c) performing at least one contingency analysis of the utility network; and (d) storing contingency analysis results in a memory device.

Figure 1:
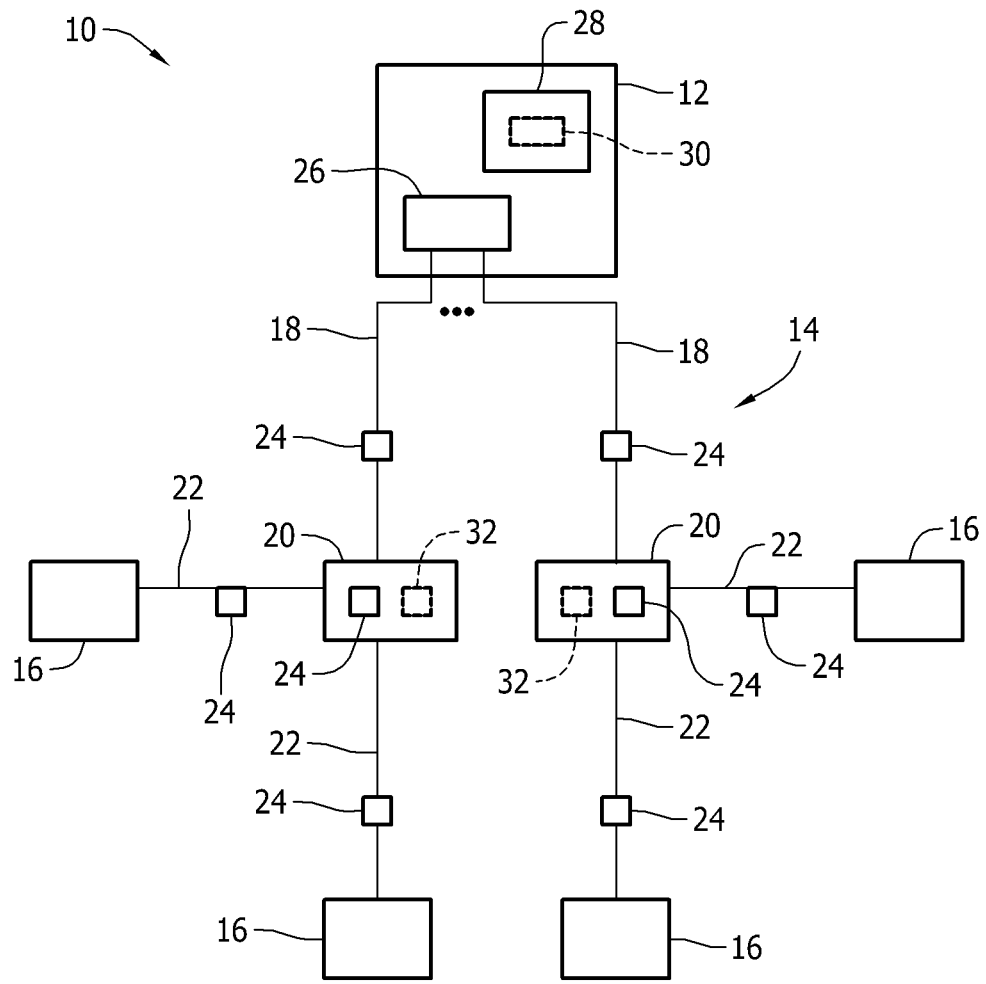
FIG. 1 is a block diagram of an exemplary electric power generation and delivery system.

FIG. 1 is a block diagram of an exemplary electric power generation and delivery system 10. In the exemplary embodiment, electric power generation and delivery system 10 includes an electric utility 12, an electric network 14, and a plurality of customer or energy user locations 16. Moreover, in the exemplary embodiment, electricity is delivered from electric utility 12 to customer or energy user locations 16 via electric network 14. Furthermore, in the exemplary embodiment, electric network 14 includes a plurality of transmission lines 18, a plurality of electric substations 20, a plurality of distribution lines 22, and a plurality of transmission elements 24. Transmission elements 24 may include, without limitation, buses, breakers, transformers, switches, capacitors, etc. Moreover, in the exemplary embodiment, electric utility 12 includes an electric power generation system 26 that supplies electrical power to electric network 14. Electric power generation system 26 may include a generator driven by, for example, a gas turbine engine, a hydroelectric turbine, a wind turbine, one or more solar panels, and/or another suitable generation system.

In the exemplary embodiment, electric utility 12 also includes a transmission and/or distribution control center substation 28 that controls energy production and delivery. Transmission and/or distribution control center substation 28 is illustrated as being included within electric utility 12, however, distribution control center substation 28 may be external to electric utility 12 (e.g., remotely located, etc.) and in communication with electric utility 12.

As illustrated, transmission and/or distribution control center substation 28 includes a management system 30. Management system 30 enables operator control for managing power delivered from electric power generation system 26 and/or distributed into electric network 14. Management system 30 may control distribution to electrical substations 20, to customer or energy user locations 16, or to other suitable point within electric network 14. Management system 30 may be usable to detect and monitor conditions in electric network 14, to alter a configuration of electric network 14, or to perform other operations associated with electric network 14 and/or electric power generation system 26.

Electric substations 20 may include a management system 32 Management system 32 enables operator control for managing power delivered from each electric substation 20. Management system 32 may control distribution to other electrical substations 20, to customer or energy user locations 16, or to other suitable points within electric network 14. Management system 30 may be usable to detect and monitor downstream conditions in electric network 14, to alter a configuration of electric network 14, to perform or other operations associated with one or both of electric network 14 and substations 20.

Figure 2:
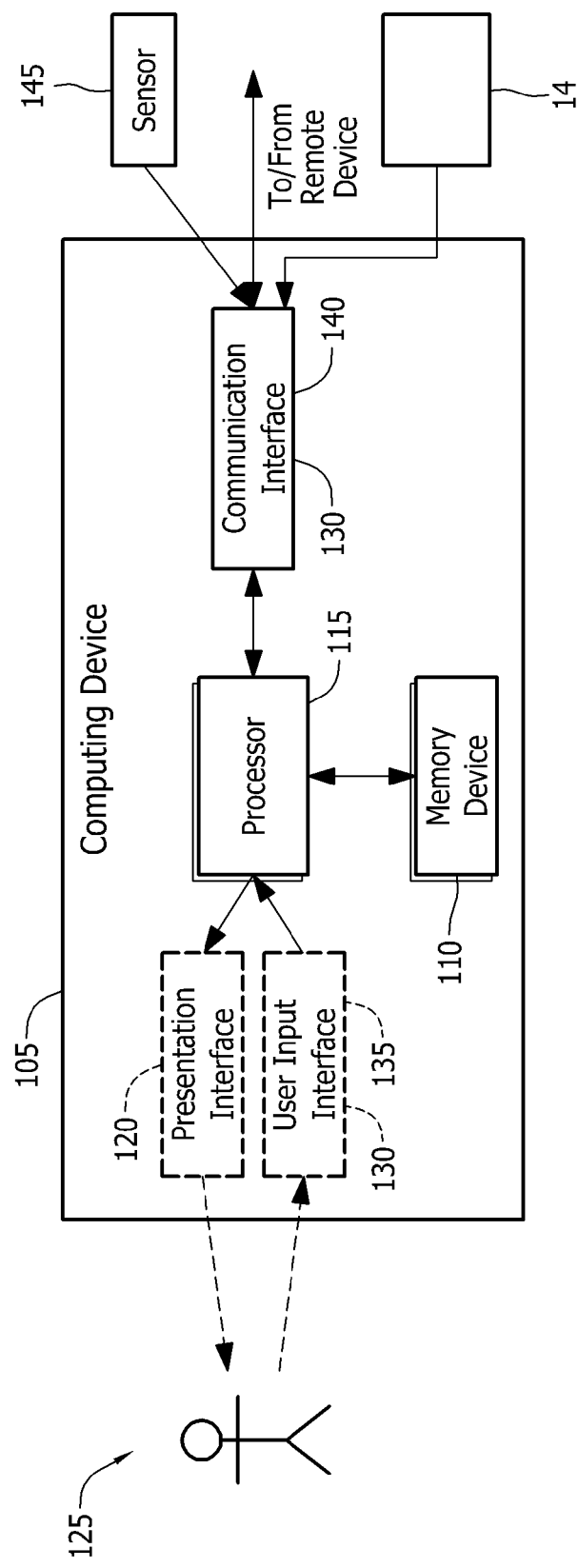
FIG. 2 is a block diagram of an exemplary computing device that may be used to monitor the electric power generation and delivery system of FIG. 1.

Management system 30 and management system 32 may each include a computing device 105. FIG. 2 is a block diagram of an exemplary computing device 105 that may be used with systems 30 and/or 32. In the exemplary embodiment, computing device 105 includes a memory device 110 and a processor 115 coupled to memory device 110 for executing instructions. In some embodiments, executable instructions are stored in memory device 110. Computing device 105 performs one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

Memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, computer-executable instructions, CA algorithms, CA results, and/or any other type of data.

In some embodiments, computing device 105 includes a presentation interface 120 that is coupled to processor 115. Presentation interface 120 presents information, such as a user interface, application source code, input events, and/or validation results to a user 125. For example, presentation interface 120 may include a display adapter (not shown in FIG. 2) that may be coupled to a display device, such as a cathode ray tube (CRT), a liquid crystal display (LCD), a light emitting diode (LED) display, an organic LED (OLED) display, and/or an "electronic ink" display. In some embodiments, presentation interface 120 includes one or more display devices. In addition to, or in the alternative, presentation interface 120 may include an audio output device (e.g., an audio adapter and/or a speaker) and/or a printer.

In some embodiments, computing device 105 includes an input interface 130, such as a user input interface 135 or a communication interface 140. Input interface 130 may be configured to receive any information suitable for use with the methods described herein.

In the exemplary embodiment, user input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 135.

Communication interface 140 is coupled to processor 115 and is configured to be coupled in communication with one or more remote devices, such as another computing device 105, a remotely located memory device (not shown in FIG. 2), and/or one or more sensors. For example, communication interface 140 may include, without limitation, a serial communication adapter, a wired network adapter, a wireless network adapter, and/or a mobile telecommunications adapter. Communication interface 140 may also transmit data to one or more remote devices. For example, a communication interface 140 of one computing device 105 may transmit CA results, sensor data, etc. to the communication interface 140 of another computing device 105.

Figure 3:
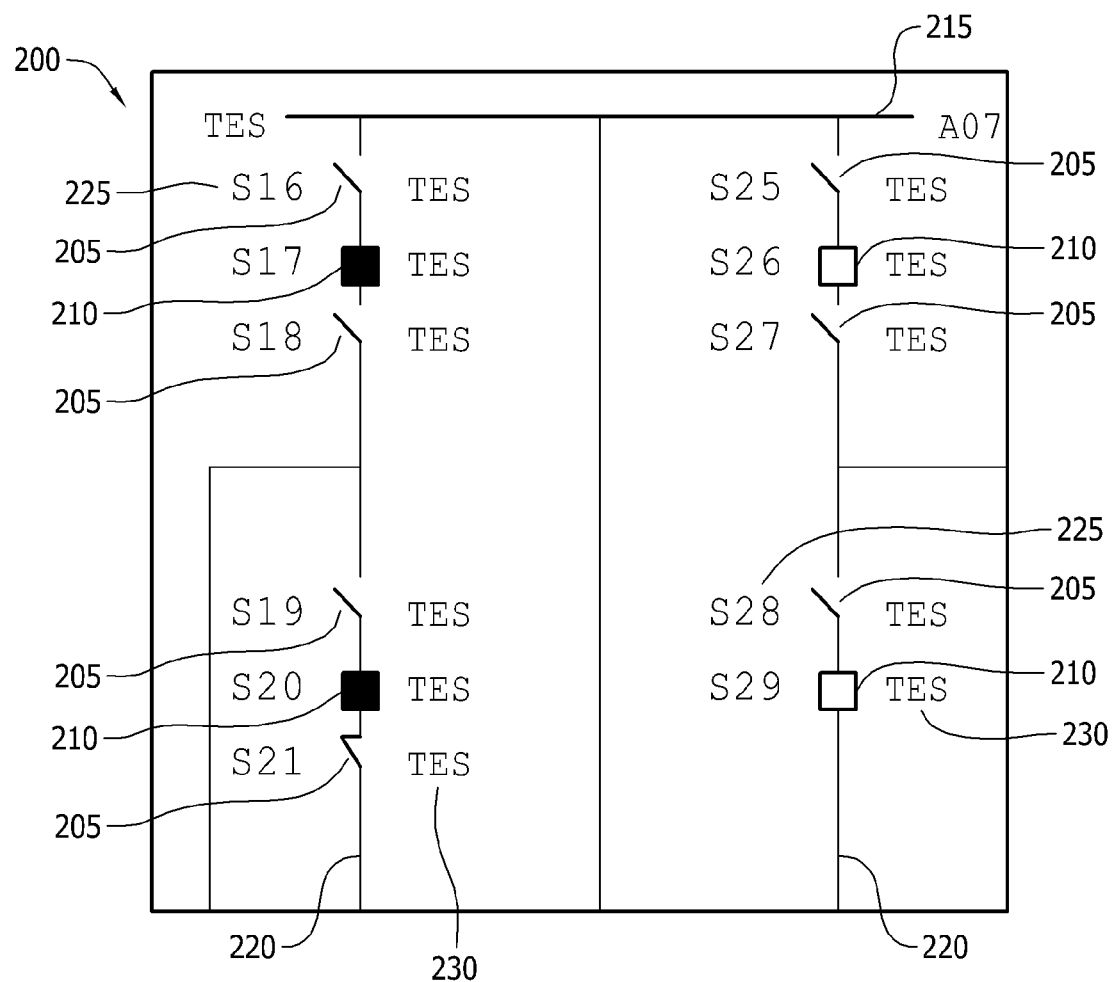
FIG. 3 is an exemplary graphical display that may be used to present a portion of the electric power generation and delivery system of FIG. 1 to a user.

In some embodiments, computing device 105 may present to user 125 a graphical representation of electric network 14 or a portion of electric network 14. FIG. 3 illustrates an example graphical representation 200 of a portion of electric network 14 that may be presented to user 125 via computing device 105. In this particular embodiment, the two dimensional (2D) graphical representation 200 is a one-line diagram. Graphical representation 200 may, however, be any other suitable graphical representation of all, or of a portion of, electric network 14. In some embodiments, graphical representation 200 includes a one-line diagram and/or a geospatial view of electric network 14. In the exemplary embodiment, graphical representation 200 includes graphical representations of transmission elements 24. In this particular example, transmission elements 24 include a plurality of switches 205, a plurality of breakers 210, a voltage bus 215, and a plurality of transmission lines 220. Although not shown in FIG. 3, graphical representation 200 may also include graphical representations of other transmission elements 24, such as transformers, capacitors, and/or any other appropriate transmission elements. Graphical representation 200 also includes a plurality of device identifiers 225 that are each associated with one of the displayed transmission elements 24.

The portion of electric network 14 to be presented in graphical representation 200 may be variably selectable by user 125. For example, user 125 may select, such as via user input interface 135, whether entire electric network 14, or only a portion of electric network 14 should be displayed as graphical representation 200. Further, if user 125 selects only a portion of electric network 14, user 125 may select which portion of electric network 14 is presented as graphical representation 200. This enables user 125 to view the entire electric network 14 or to zoom in on a particular area of interest within electric network 14.

Computing device 105 may continuously or periodically update graphical representation 200 to indicate a current status of electric network 14 and/or transmission elements. For example, computing device 105 may present via graphical representation 200 whether switches 205 are open or closed, and/or whether breakers 210 are tripped, etc. The current status and data concerning electric network 14 and/or the displayed transmission elements may be presented by changing the displayed element, such as by displaying a closed switch 205 rather than an open switch 205, and/or by presenting a plurality of status indicators 230, that are each associated with a transmission element, and/or a combination of status indicators and changed elements, for example.

In some embodiments, described above, memory device 110 may store CA results or CA algorithms. For example, the CA may be performed by computing device 105 with the CA results stored in memory device 110. In some embodiments another computing device (not shown), including a remote computing device, may perform CA and provide CA results to computing device 105 for storage in memory device 110. Alternatively, or additionally, another computing device may perform CA and store CA results in a memory device other than memory device 110. In such embodiments, computing device 105 can access or request CA results from the other computing device, memory device, etc. when appropriate.

When CA is performed on electric network 14, one or more contingencies is analyzed to determine how such contingencies may impact the electric network 14. Such contingencies can include an increasing demand, failure of one or more transmission elements 24, failure of one or more generators in electric power generation system 26, changing ambient temperatures, electrical tripping of a breaker 210, combinations of failures, etc. The CA results may include one or more contingent performance violations. As used herein, a contingent performance violation is an undesirable result associated with one of transmission elements 24. Contingent performance violations may include failure of at least one transmission element 24, overloading of at least one transmission element 24, overheating of at least one transmission element 24, etc. A particular contingency may yield one or more contingent performance violations or may yield no contingent performance violations. Each contingent performance violation, if any, is associated with a particular transmission element 24. Because multiple contingencies are often analyzed during CA, one or more of transmission elements 24 may be associated with more than one contingent performance violation.

Figure 4:
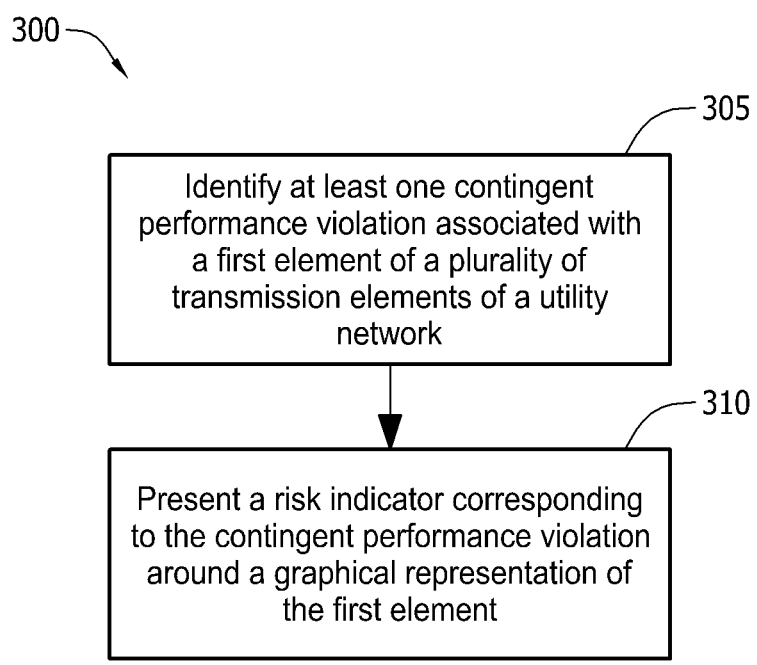
FIG. 4 is a block diagram of an exemplary method that may be used to monitor the electric power generation and delivery system of FIG. 1

FIG. 4 is a block diagram of an exemplary method 300 that may be used in monitoring a utility network, such as electric network 14, shown in FIG. 1. Although method 300 is described herein with reference to electric network 14 and computing devices 105, method 300 may be applied to any suitable utility network and/or to any suitable computing device.

In the exemplary embodiment, at least one contingent performance violation is identified 305 by computing device 105. Computing device 105 may identify 305 a contingency performance violation by accessing CA results stored in memory device 110, by accessing CA results stored in a memory device other than memory device 110, and/or by performing CA, etc. The identified contingent performance violation is associated with a first element of transmission elements 24. A risk indicator corresponding to the contingent performance violation is presented 310 adjacent to the graphical representation of the first element.

Figure 5:
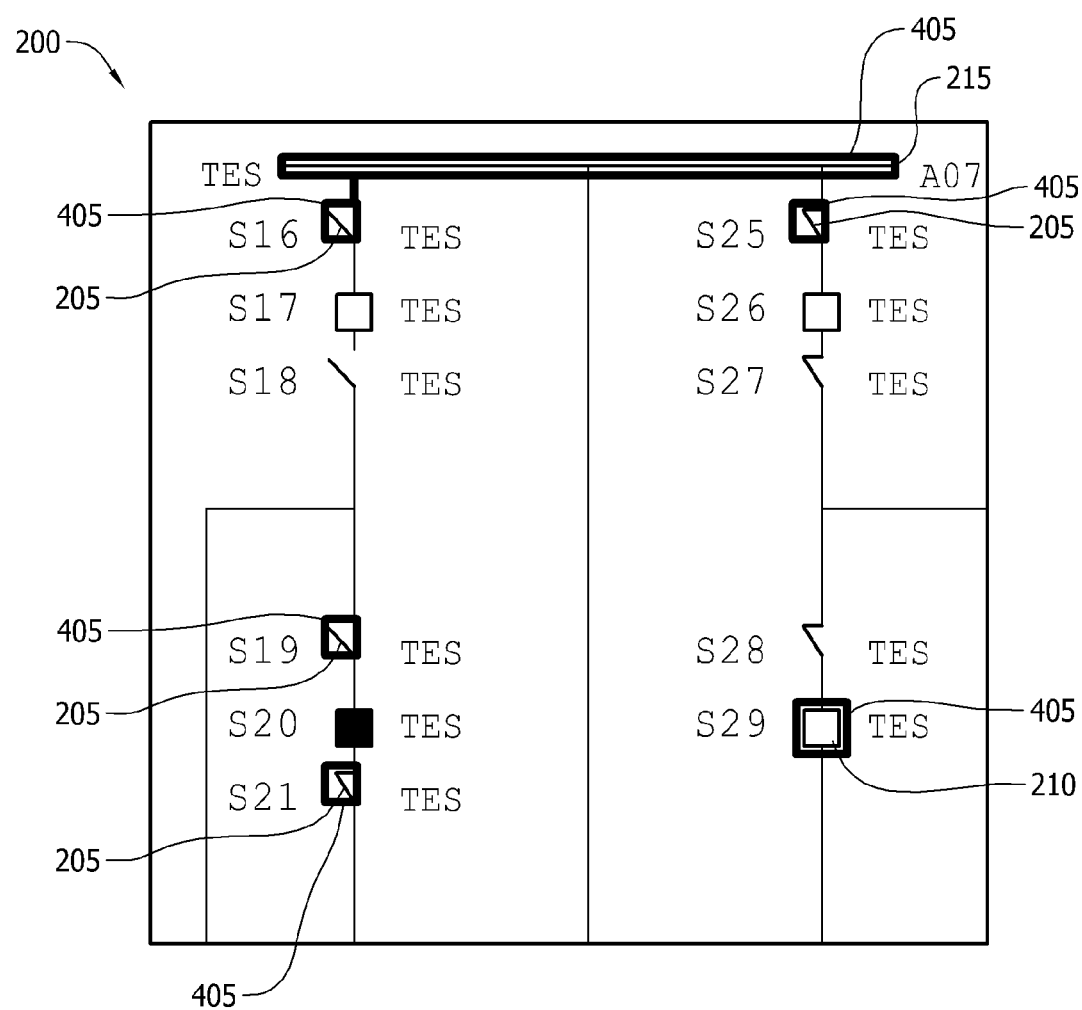
FIG. 5 is the exemplary graphical display of FIG. 3 with risk indicators presented in accordance with the exemplary method of FIG. 4.

FIG. 5 illustrates the graphical representation 200 including a plurality of risk indicators 405. Each risk indicator 405 is presented adjacent to and around the graphical representation of one transmission element 24. Risk indicators 405 indicate that at least one contingent performance violation is associated with the particular transmission element 24 around whose graphical representation it is displayed. Moreover, risk indicators 405 highlight transmission elements 24 to present CA results, and particularly contingent performance violations, to user 125. The underlying graphical representations of transmission elements 24 are not changed or obscured by presentation of risk indicators 405. Thus, the underlying information contained in graphical representation 200 remains visible and is not lost with the presentation of CA results via risk indicators 405. Although generally illustrated in FIG. 5 as being a square shaped indicator, risk indicators 405 may be any closed shape (e.g., square, circle, triangle, etc.) that extends around a particular transmission element 24. Additionally, or alternatively, risk indicators 405 may be an open shape that extends at least partially around a particular transmission element 24. For example, in FIG. 5 risk indicator 405, around voltage bus 215, highlights voltage bus 215 without completely enclosing voltage bus 215.

Although risk indicators 405 shown in FIG. 5 are illustrated as being generally the same size, shape, and color, risk indicators 405 may be varied (e.g., different sizes, shapes and/or colors) to convey additional, or alternative, information to user 125. For example, the thickness the lines making up risk indicators 405 may be varied to convey a likelihood of a contingency affecting a particular transmission element 24 relative to the likelihood of a contingency affecting other transmission elements 24. Thus, for example, a risk indicator 405 with thicker lines may be used to indicate that the particular transmission element 24 is more likely to experience a performance violation than other transmission elements 24 with risk indicators 405 drawn with thinner lines. Similarly, relative likelihood of a performance violation may be indicated by color, shape, etc. of risk indicators 405. Variations in color, shape, size, etc. of risk indicators 405 may, additionally or alternatively, indicate a relative magnitude of one or more contingent performance violations. Thus, risk indicators 405 may indicate which transmission elements 24 are likely to experience more severe problems. Risk indicators 405 may be varied, additionally or alternatively, based on the type of contingent performance violation(s) associated with transmission elements 24. For example, a risk indicator 405 having a first shape may be used to indicate an overvoltage performance violation, while an indicator 405 with a different shape may be used to indicate an over-temperature violation, etc. Moreover, risk indicators 405 may be varied to indicate the number of contingent performance violations associated with a particular transmission element 24. In some embodiments, combinations of variations, such as discussed above, may be used to convey more than one characteristic of contingent performance violation.

In some embodiments, risk indicators 405 are presented around the appropriate transmission elements 24 in response to a selection by user 125. In this embodiment, graphical representation 200 may be presented to user 125 as illustrated in FIG. 3. When, and if, user 125 wants to view CA information, user 125 inputs a selection, such as via a menu, button, etc., to view CA information. In response to input of the selection risk indicators 405 are presented on graphical representation 200, as shown in FIG. 5. In other embodiments, CA information may be presented continually and/or automatically. For example, CA information may be automatically presented when a particular conditions, such as determination of a certain number of contingent performance violations, determination of a contingent performance violation of a severity exceeding a predetermined threshold, etc.

In some embodiments, user 125 may input a selection to computing device 105 to view additional information about contingent performance violations indicated by risk indicators 405. User 125 may select, such as via a pointer, a touch on a touch screen, a typed command, etc., a particular risk indicator 405 about which user desires more information. In response to the selection, additional CA data will be presented to user 125. The additional data may be presented in a pop-up within the current graphical representation, in a separate module, window, etc. The additional information may be presented in a summary, a table, a matrix, or any other suitable format.

The above-described embodiments of a method and system of presenting contingency analysis data provide easy to decipher visualizations of CA data. In contrast with some known systems, the methods and systems described herein provide more visual feedback of contingencies to an operator and provide CA data correlated with geographical information. Moreover, the methods and systems described herein present CA data to an operator without changing and/or obscuring the underlying network representation and the information contained therein. As a result, the method and system described herein facilitate managing electric grid operation and maintenance in a user-friendly, cost-effective and reliable manner.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention may be practiced with modification within the spirit and scope of the claims.

What is claimed is:

1. A method for use in monitoring a utility network, said method comprising:
    identifying, via a computing device, at least one contingent performance violation associated with a first element of a plurality of transmission elements of a utility network and at least one contingent performance violation associated with a second element of the plurality of transmission elements;
    presenting, by the computing device, a graphical representation of the plurality of transmission elements of the utility network as a two-dimensional, one-line diagram; and
    presenting, by the computing device, a first risk indicator corresponding to a first contingent performance violation adjacent to and circumscribed around the graphical representation of the first element and a second risk indicator corresponding to a second contingent performance violation adjacent to and circumscribed around the graphical representation of the second element, wherein the second risk indicator is graphically distinguishable from the first risk indicator, and wherein the first and second risk indicators do not change the graphical representation the first and second elements.

2. The method of claim 1, further comprising:
    performing, by the computing device, at least one contingency analysis of the utility network; and
    storing, by the computing device, contingency analysis results in a memory device.

3. The method of claim 1, wherein identifying the at least one contingent performance violation comprises accessing contingency analysis results stored in a memory device.

4. The method of claim 1, wherein presenting a risk indicator further comprises presenting a risk indicator corresponding to a contingent performance violation that indicates an operational characteristic of the first element is outside a determined range.

5. The method of claim 1, wherein presenting a risk indicator further comprises presenting a risk indicator that indicates one of a severity of the contingent performance violation and a likelihood of the contingent performance violation.

6. The method of claim 1, wherein said presenting the risk indicator corresponding to the contingent performance violation circumscribed around the graphical representation of the first element is performed in response to a user selection input to the computing device.

7. A system for use in monitoring a utility network, said system comprising:
    a memory device configured to store a plurality of contingency analysis results associated with a utility network; and
    a processor coupled in communication with said memory device, said processor programmed to:
        identify at least one contingent performance violation associated with a first element of a plurality of transmission elements of the utility network and at least one contingent performance violation associated with a second element of the plurality of transmission elements;
        present, via said display device, a graphical representation of the plurality of transmission elements of the utility network as a two-dimensional, one-line diagram; and graphically present a first risk indicator corresponding to a first contingent performance violation adjacent to and circumscribed around the graphical representation of the first element and a second risk indicator corresponding to a second contingent performance violation adjacent to and circumscribed around the graphical representation of the second element, wherein the second risk indicator is graphically distinguishable from the first risk indicator, and wherein the first and second risk indicators do not change the graphical representation the first and second elements.

8. The system of claim 7, wherein said processor is further programmed to:
perform at least one contingency analysis of the utility network; and
store the contingency analysis results in said memory device.

9. The system of claim 7, wherein said processor is further programmed to access contingency analysis results stored in said memory device to identify the at least one contingent performance violation.

10. The system of claim 7, wherein said processor is further programmed to graphically present the risk indicator to indicate one of a severity of the contingent performance violation and a likelihood of the contingent performance violation.

11. The system of claim 7, further comprising an input device, wherein said processor is further programmed to present the risk indicator corresponding to the contingent performance violation circumscribed around the graphical representation of the first element in response to a user selection input via said input device.

12. The system of claim 7, further comprising a display device coupled in communication with said processor, wherein said processor is further programmed to present a graphical representation of the risk indicator via said display device.

13. One or more non-transitory computer-readable storage media having computer-executable instructions embodied thereon, wherein when executed by at least one processor, the computer-executable instructions cause the at least one processor to:
identify at least one contingent performance violation associated with a first element of a plurality of transmission elements of a utility network and at least one contingent performance violation associated with a second element of the plurality of transmission elements;
present a graphical representation of the plurality of transmission elements of the utility network as a two-dimensional, one-line diagram; and
present a first risk indicator corresponding to a first contingent performance violation adjacent to and circumscribed around the graphical representation of the first element and a second risk indicator corresponding to a second contingent performance violation adjacent to and circumscribed around the graphical representation of the second element, wherein the second risk indicator is graphically distinguishable from the first risk indicator, and wherein the first and second risk indicators do not change the graphical representation the first and second elements.

14. The one or more non-transitory computer-readable storage media according to claim 13, wherein when executed by at least one processor, the computer-executable instructions cause the at least one processor to:
perform at least one contingency analysis of the utility network; and
store contingency analysis results in a memory device.

15. The one or more non-transitory computer-readable storage media according to claim 13, wherein when executed by at least one processor, the computer-executable instructions cause the at least one processor to identify at least one contingent performance violation at least in part by accessing contingency analysis results stored in a memory device.

16. The one or more non-transitory computer-readable storage media according to claim 13, wherein when executed by at least one processor, the computer-executable instructions cause the at least one processor to present the risk indicator to indicate one of a severity of the contingent performance violation and a likelihood of the contingent performance violation.

17. The one or more non-transitory computer-readable storage media according to claim 13, wherein when executed by at least one processor, the computer-executable instructions cause the at least one processor to present the risk indicator corresponding to the contingent performance violation circumscribed around the graphical representation of the first element in response to a user selection.

* * * * *

UNITED STATES PATENT AND TRADEMARK OFFICE
CERTIFICATE OF CORRECTION

| | | |
|---|---|---|
| PATENT NO. | : 9,083,183 B2 | Page 1 of 1 |
| APPLICATION NO. | : 13/221229 | |
| DATED | : July 14, 2015 | |
| INVENTOR(S) | : Mehta | |

It is certified that error appears in the above-identified patent and that said Letters Patent is hereby corrected as shown below:

Claims

In Column 8, Line 28, in Claim 1, delete "representation the" and insert -- representation of the --, therefor.

In Column 9, Line 11, in Claim 7, delete "representation the" and insert -- representation of the --, therefor.

In Column 10, Line 16, in Claim 13, delete "representation the" and insert -- representation of the --, therefor.

Signed and Sealed this
Nineteenth Day of January, 2016

Michelle K. Lee
*Director of the United States Patent and Trademark Office*